Jan. 31, 1933.  W. A. CALHOUN  1,895,969
FLEXIBLE BELT FASTENER
Filed May 4, 1932   2 Sheets-Sheet 1
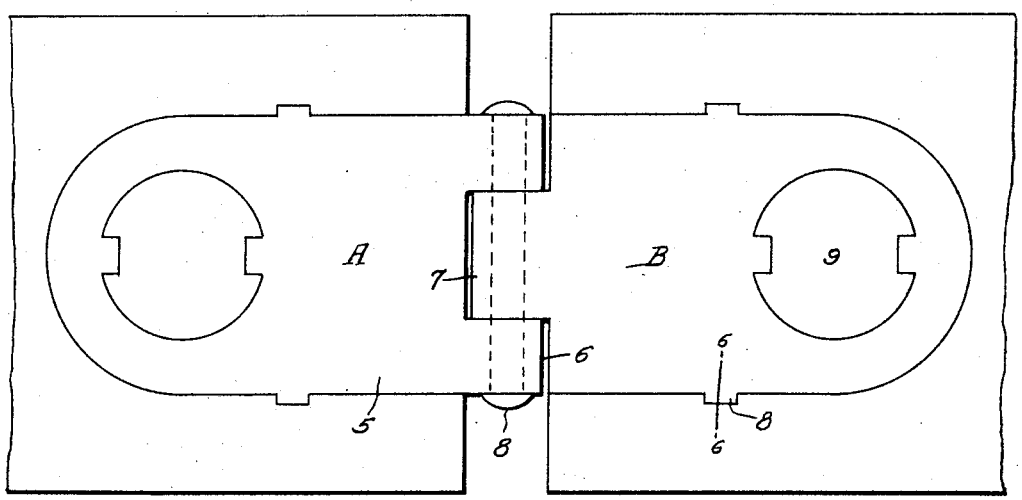
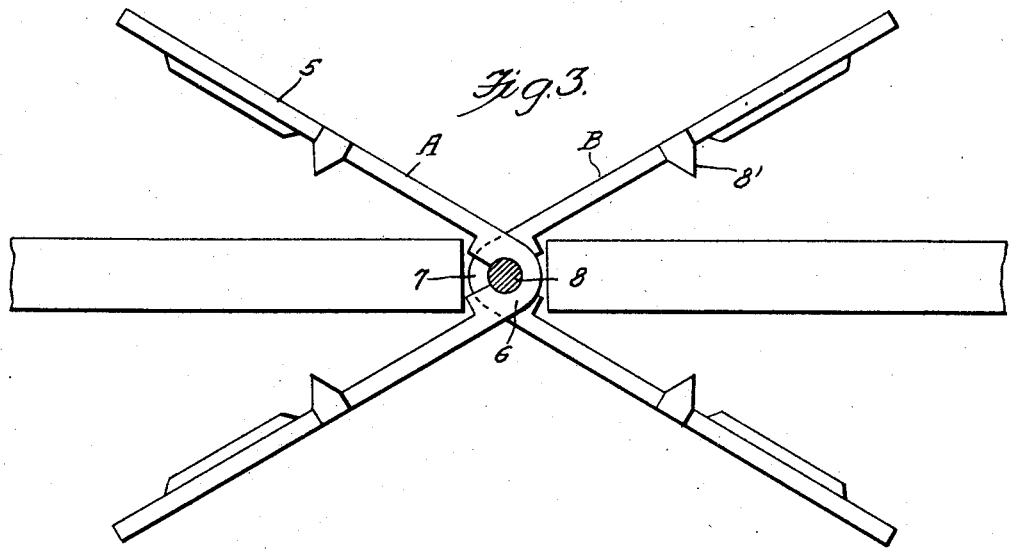
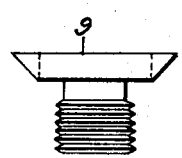
Inventor
Willis A. Calhoun,
By *Clarence A. O'Brien*
Attorney Jan. 31, 1933.  W. A. CALHOUN  1,895,969
FLEXIBLE BELT FASTENER
Filed May 4, 1932  2 Sheets-Sheet 2
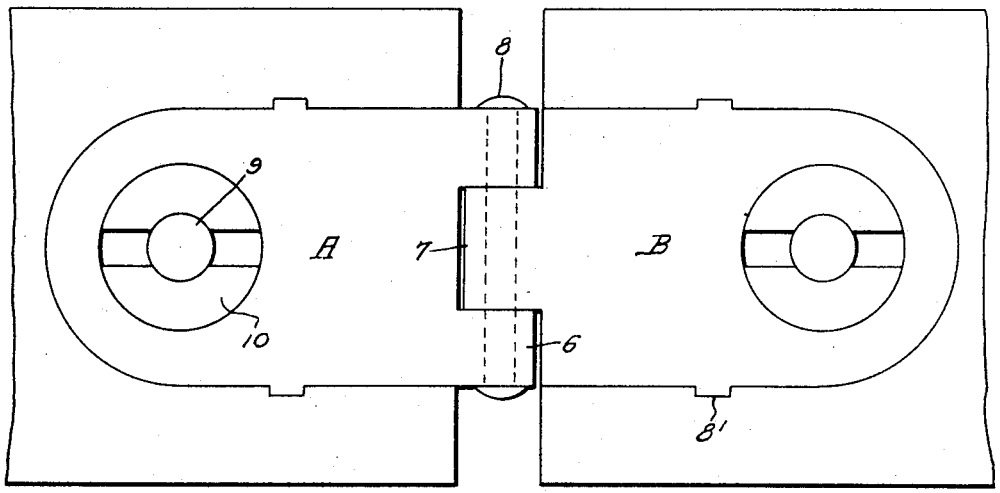
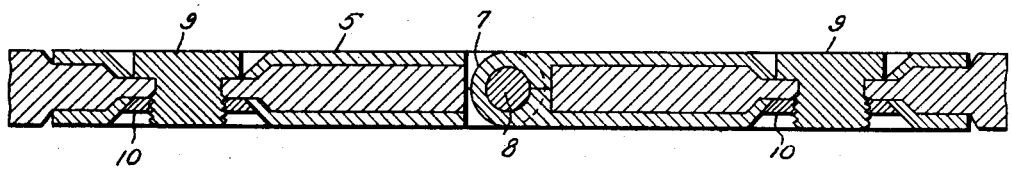
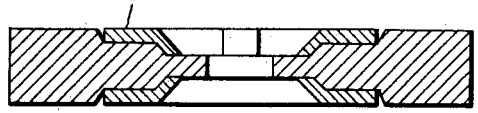
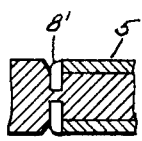

Patented Jan. 31, 1933

1,895,969

UNITED STATES PATENT OFFICE

WILLIS ALEXANDER CALHOUN, OF MASCOT, TENNESSEE

FLEXIBLE BELT FASTENER

Application filed May 4, 1932. Serial No. 609,215.

The present invention relates to a belt fastener and has for its prime object to provide means whereby the fastener is flexible and may be easily and quickly engaged with the ends of a belt or disengaged therefrom.

Another object of the invention resides in the provision of a flexible belt fastener of this nature which is exceedingly simple in its construction, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 1 is a plan view of the fastener,

Figure 2 is a similar view opposite to that shown in Figure 1.

Figure 3 is a side elevation showing the fastener before bent into place.

Figure 4 is a longitudinal section through the fastener.

Figure 5 is a transverse section therethrough.

Figure 6 is a detail section taken substantially on the line 6—6 of Figure 1, and Figure 7 is a detail elevation of the bolt and nut.

Referring to the drawings in detail it will be seen that the fastener is formed in two sections A and B. Each section comprises a pair of plates 5 connected by bights 6 and 7 through which a pin 8 extends with the bight 7 located between the bights 6. The ends of the belt are placed between the plates 5 as shown in Figure 3 and then the plates are bent toward the ends of the belt so that spikes 8' on the side edges of the plates bight into the belt. The plates have openings which register with openings in the ends of the belt so that bolts 9 may be extended therethrough and nuts 10 tightened thereon and thereby securely clamping the plates on the ends of the belt without the necessity of using a hammer or the like.

It is thought that the construction, operation, utility and advantages of this invention will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It wil be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A flexible belt fastener of the class described comprising a pair of sections, a pin, each section comprising a pair of plates connected by a bight through which the pin extends said bights each completely encircling said pin for preventing shifting movement of the plates with respect to said pin.

2. A flexible belt fastener of the class described comprising a pair of sections, a pin, each section comprising a pair of plates connected by a bight through which the pin extends, said bights each completely encircling said pin for preventing shifting movement of the plates with respect to said pins, said bights being bendable so that the plates may be clamped on to belt ends, said plates being provided with spikes to bight into the belt ends.

In testimony whereof I affix my signature.

WILLIS ALEXANDER CALHOUN.